(12) United States Patent
Sander (10) Patent No.: US 7,102,818 B2
(45) Date of Patent: Sep. 5, 2006

(54) MICROSCOPE HAVING A SYSTEM FOR REFLECTING IN ILLUMINATION

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/222,043

(22) Filed: Aug. 16, 2002

(65) Prior Publication Data

US 2003/0048530 A1 Mar. 13, 2003

(30) Foreign Application Priority Data

Sep. 7, 2001 (DE) ................................ 101 44 062

(51) Int. Cl.
  *G02B 21/06* (2006.01)
  *G02B 21/00* (2006.01)

(52) U.S. Cl. ....................... 359/389; 359/368; 359/385

(58) Field of Classification Search ........ 359/368–390, 359/738–741, 618–630; 351/200–247
See application file for complete search history.

(56) References Cited

U.S. PATENT DOCUMENTS

| | | | |
|---|---|---|---|
| 2,850,944 A | | 9/1958 | Engelmann ................. 359/385 |
| 4,634,241 A | * | 1/1987 | Kohayakawa et al. ...... 359/377 |
| 4,674,845 A | * | 6/1987 | Matsumura .................. 359/377 |
| 4,691,997 A | * | 9/1987 | Muchel ........................ 359/364 |
| 4,715,704 A | * | 12/1987 | Biber et al. .................. 351/207 |
| 4,779,968 A | * | 10/1988 | Sander ........................ 359/389 |
| 5,126,877 A | * | 6/1992 | Biber ........................... 359/389 |
| 5,270,747 A | * | 12/1993 | Kitajima et al. ............. 351/205 |
| 5,347,328 A | * | 9/1994 | Sekine et al. ............... 351/211 |
| 5,760,952 A | * | 6/1998 | Koetke ........................ 359/389 |
| 5,801,807 A | * | 9/1998 | Satake et al. ............... 351/221 |
| 5,969,856 A | * | 10/1999 | Greenberg ................... 359/390 |
| 6,239,904 B1 | | 5/2001 | Serfling et al. .............. 359/350 |
| 6,483,642 B1 | * | 11/2002 | Deverin ....................... 359/389 |

FOREIGN PATENT DOCUMENTS

| | | | |
|---|---|---|---|
| DE | 3623613 A1 | 1/1988 | |
| DE | 40 28 605 A1 | 3/1992 | |
| DE | 196 50 773 A1 | 7/1997 | |
| DE | 197 28 035 A1 | 1/1998 | |
| JP | 8-122649 | * 5/1996 | ................. 359/368 |
| JP | 10133122 A | 5/1998 | |
| JP | 11038327 A | 2/1999 | |
| JP | 11109254 A | 4/1999 | |

OTHER PUBLICATIONS

English translation of the Japanese reference No. 8-122649.*

* cited by examiner

*Primary Examiner*—Thong Q. Nguyen
(74) *Attorney, Agent, or Firm*—Hodgson Russ LLP (57) ABSTRACT

The invention concerns a (stereoscopic) surgical microscope having a system for reflecting in illumination in which the illumination beam path (5) is switched into the microscope's main beam path via a deflection element (1) whose diameter exceeds the spacing of the observation beam paths (3). Different illumination angles for the specimen (10) can be generated by means of a stop (8) that is shiftable radially about the axis (5a) of the illumination beam path (5).

17 Claims, 7 Drawing Sheets

MICROSCOPE HAVING A SYSTEM FOR REFLECTING IN ILLUMINATION

CROSS REFERENCE TO RELATED APPLICATIONS

This application claims priority of the German patent application 101 44 062.6 filed Sep. 7, 2001 which is incorporated by reference herein.

FIELD OF THE INVENTION

The invention concerns a stereoscopic surgical microscope having a system for reflecting in illumination with which an illumination beam path is switched via a deflecting prism into the main beam path of the microscope.

BACKGROUND OF THE INVENTION

Reflected-in beam paths for illumination of a specimen field are used in a wide variety of applications, and in particular in the medical field. Usually the illumination beam path is reflected into the main beam path of the microscope via a deflecting mirror or deflecting prism, which as a rule is mounted on the axis of the microscope's main beam path. This results in illumination of the specimen surface directly on the axis of a microscope's main beam path. If the illumination is applied laterally from the axis of the main beam path, this usually results in more or less undesirable shadowing.

For a number of applications, however, an illumination deviating from the observation axis is desirable. The Zeiss company achieves this, as is known from DE-A-40 28 605 and DE-A-197 28 035, by way of a second mirror. For ophthalmic surgery in particular, a so-called "zero-degree" illumination ("zero-degree" indicating illumination on the axis of the main beam path) is inclined at a small angle of e.g. 6 degrees in order to improve the visibility of the surgical field.

In a particular embodiment of the system for reflecting in illumination (cf. DE-A-196 50 773), the Möller company asserted the idea of introducing light directly into the observation beam paths.

In order to achieve partial darkening of the specimen field, stops are used as necessary in the illumination beam path (cf. U.S. Pat. No. 4,715,714 in this context). These are located, however, in the illumination location conjugated with the specimen field. Stops of this kind can be used, for example, to reduce the so-called "red reflection," once again in ophthalmic surgery. In order deliberately to reduce tissue stress, other stops serve to exclude the light directed via the respective mirror.

The inventor has recognized that the known systems are disadvantageous in the following respects:

a) At present, continuous adaptation of the illumination angle in the radial and axial directions with respect to the microscope's main beam path is not possible.
b) Oblique illumination via two mirrors makes possible only predefined illumination angles in the radial direction with respect to the microscope's main beam path, thereby resulting in a limitation in contrast selection.
c) Reflection into the observation beam paths is suitable for illumination in narrow channels, but results on the one hand in poor contrast and on the other hand in solutions that are difficult to design.
d) Because the illumination is reflected into the convergent beam path, the arrangement as defined in DE-A-36 23 613 results in light loss and double images.

SUMMARY OF THE INVENTION

The primary object of the invention is thus to create an illumination apparatus which makes it possible for light beams to strike the specimen field at variable angles, thus eliminating the disadvantages mentioned above.

This object is achieved by way of the following actions:

The illumination beam path is switched into the microscope's main beam path via a deflecting mirror whose diameter exceeds the spacing of the observation beam paths and which has unobstructed openings for the observation beam paths;

By way of a stop that is radially adjustable about the axis of the illumination beam path, any desired incidence angles can be achieved for the light beams illuminating the specimen.

Shifting the lens elements of the illuminating optical system in the illumination beam path causes the illuminated specimen field to become large with a small illumination pupil or small with a large illumination pupil.

These stops are configured to be insertable and removable, for example pivotable in and out, as necessary.

Shifting of the entire illuminating optical system, i.e. the illumination pupil via the deflecting element, also modifies the illumination angle.

According to particular embodiments, the stops, can be configured as a diaphragm, thin film, LCD, or electrochromic layer.

The situation is thus improved by the invention in the following ways:

Because, according to the present invention, the illumination beam path is reflected in via a deflecting mirror whose diameter exceeds the spacing of the observation beam paths; and because of the use, according to the present invention, of a stop that can be shifted radially in the illumination beam path, the incidence angle of the light beams illuminating the specimen can be modified in the radial direction with respect to the microscope's main beam path;

because stops are used in the illumination beam path, additional variations can be achieved, together with the illuminating optical system, to modify the specimen field illumination, for example in order to increase contrast and partially darken the specimen field.

Although reference is made in the above text to a surgical microscope, the invention is not limited thereto but rather is also available for use in other types of microscopes having additional illumination systems (e.g. microscopes for circuit-board use).

BRIEF DESCRIPTION OF THE DRAWINGS

The invention is described in more detail, by way of example, with reference to schematic depictions. In the drawings.

The Figures are described in interconnected and overlapping fashion. Identical reference characters denote identical components; reference characters having different indices indicate functionally identical components.

DETAILED DESCRIPTION OF THE INVENTION

Figure 1:
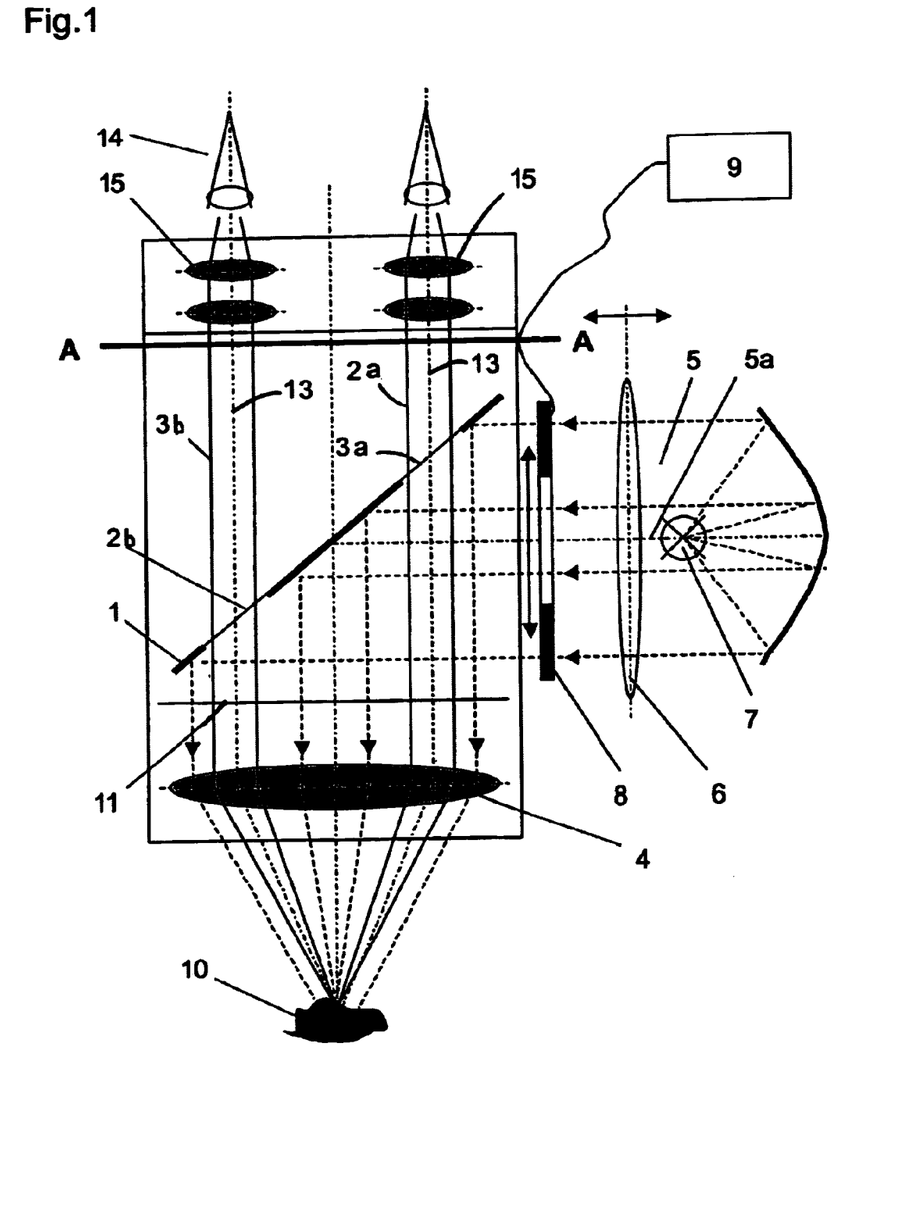
FIG. 1 schematically depicts the entire microscope assemblage with the use of a deflection element according to the present invention.

FIG. 1 schematically depicts the entire microscope assemblage with a system for reflecting illumination into the main beam path of a stereomicroscope, having a deflection element 1 whose diameter exceeds the spacing of the two observation beam paths 3a, 3b; having a main objective 4; having a zoom 11; having an illumination beam path 5; having an illuminating optical system 6; having a light source 7; having a stop 8, with an optional electronic control system 9 (if no electronic control system is provided, shifting of stop 8 is controlled manually), that is shiftable in the radial direction; and having a specimen 10. Also depicted are the arrangement of eyepieces 15, and the axes of observation beam paths 13 and of observer 14. As can be seen in FIG. 1, light source 7, a concave reflector associated with light source 7, and the illuminating optical system 6 cooperate to generate a collimated illumination beam of parallel rays traveling along an illumination axis 5a, whereby the reflector and/or illuminating optical system 6 act as collimating optics after the light source 7 for providing the collimated illumination beam. As will be further understood from FIG. 1, the stop 8 allows passage of a spatial portion of the collimated illumination beam and blocks passage of another spatial portion the collimated illumination beam. Accordingly, the stop 8 is radially adjustable relative to the illumination axis 5a to selectively allow passage of only a chosen spatial portion of the collimated illumination beam and block passage of another spatial portion of the collimated illumination beam, whereby the chosen spatial portion of the collimated illumination beam that passes through the stop 8 is deflected by a planar deflection surface of deflection element 1 to pass through the main objective 4 and illuminate a specimen.

Figure 2A:
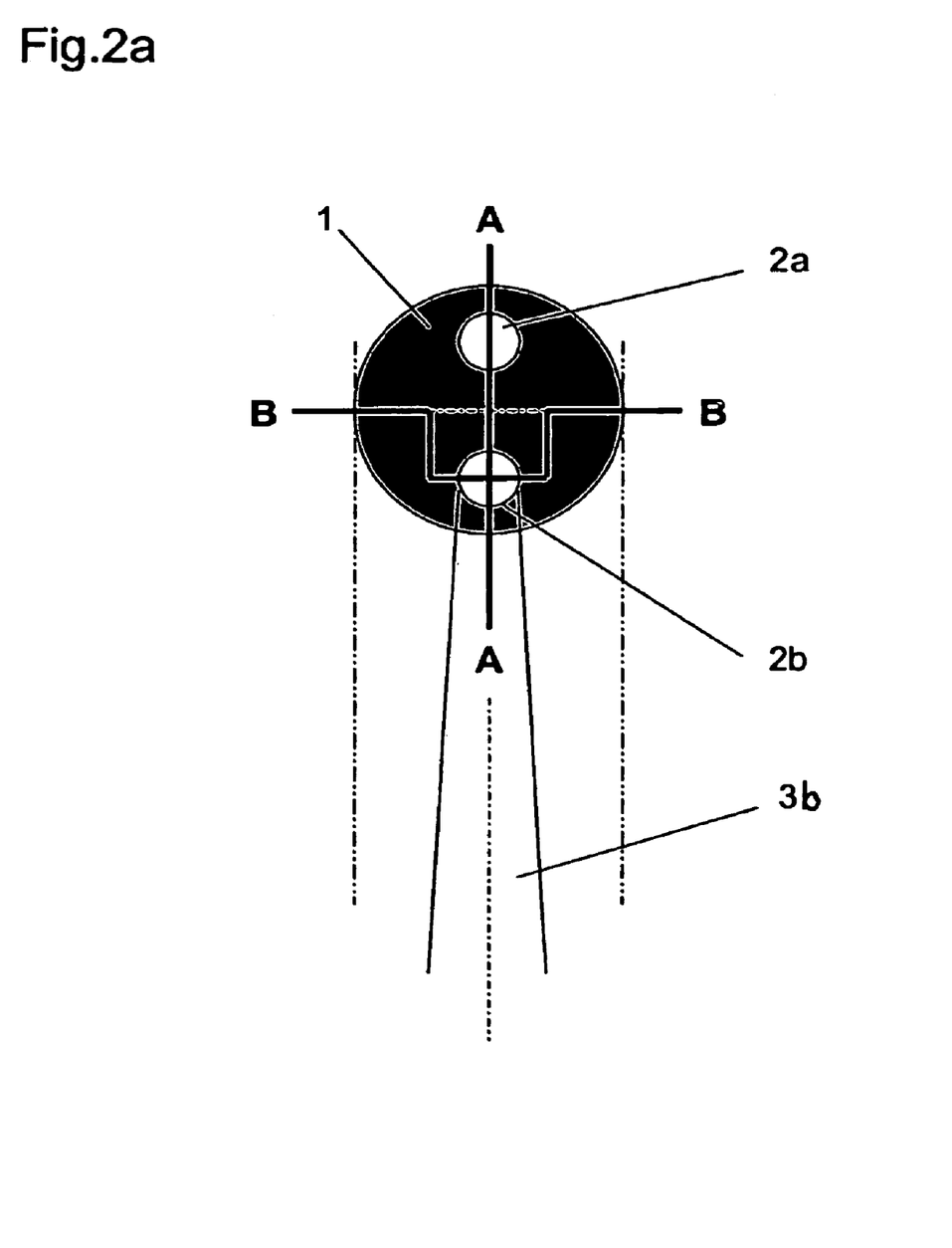
FIG. 2a is a plan view of the deflection element (deflection mirror) depicted in FIG. 1 in the main beam path of a stereoscopic surgical microscope.

FIG. 2a shows, in plan view, deflection element 1 (depicted in FIG. 1) in the main beam path of a microscope, having two openings 2a, 2b for observation beam paths 3a and 3b. Section A—A through the two openings 2a, 2b for the observation beam paths in deflection element 1 is depicted schematically in FIG. 1. Section B—B, depicted in FIG. 2a, shows a side view of the deflection element at right angles to section A—A. Thus, deflection element 1 is arranged such that it traverses observation beam paths 3a and 3b.

Figure 2B:
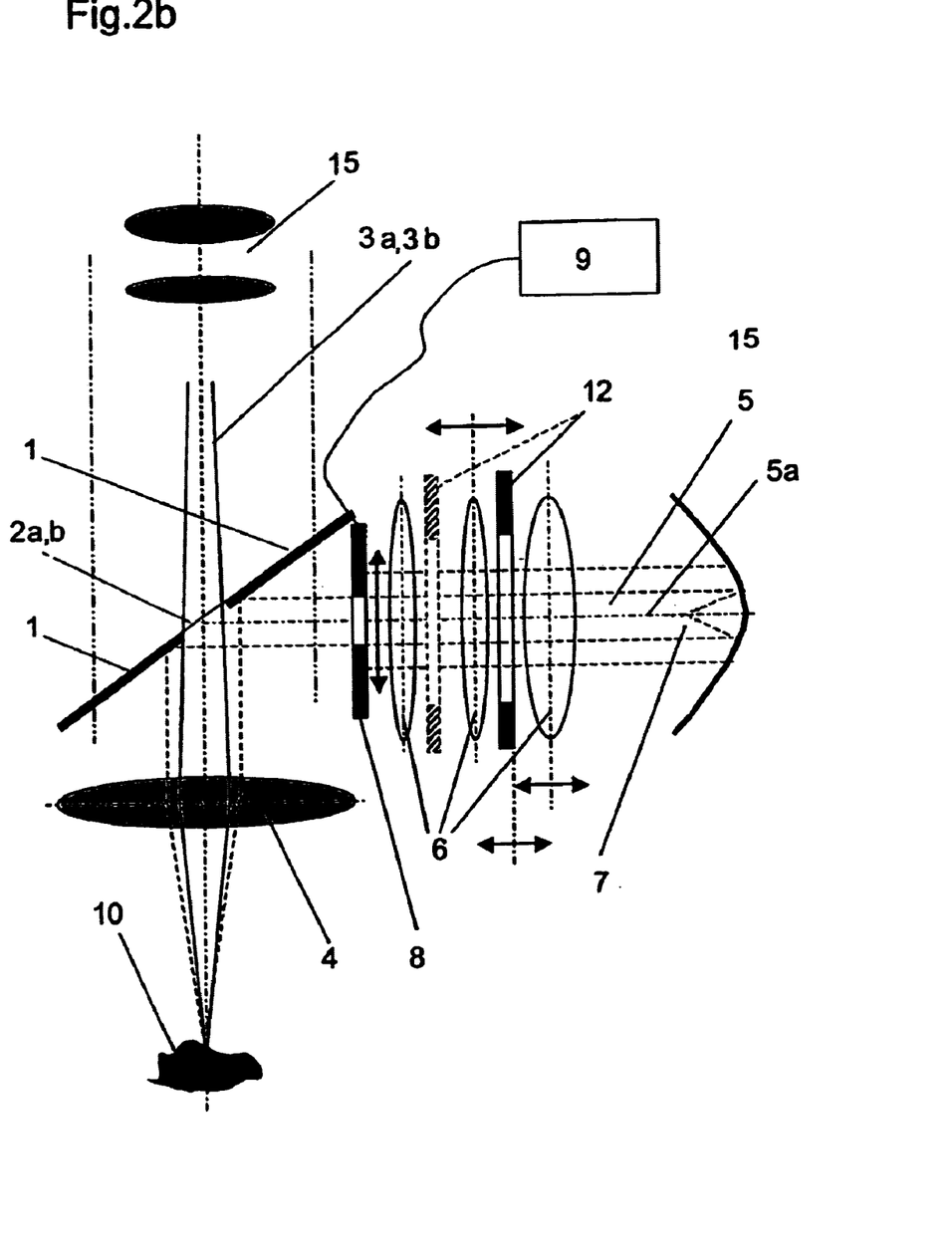
FIG. 2b schematically depicts a system for reflecting illumination into the observation beam path of a surgical microscope.

FIG. 2b schematically shows, similarly to FIG. 1, a system for reflecting illumination into observation beam paths 3a and 3b of a microscope, having a deflection element 1; having a main objective 4; having a zoom 11; having an illumination beam path 5 with axis 5a; having an axially displaceable illuminating optical system 6; having a radially and axially displaceable stop 12 in illumination beam path 5; having a light source 7 of any kind; having a stop 8 that is shiftable in the radial direction, with optional electronic control system 9 (but with no depiction of the drive system, known per se); and having a specimen 10.

Figure 3A:
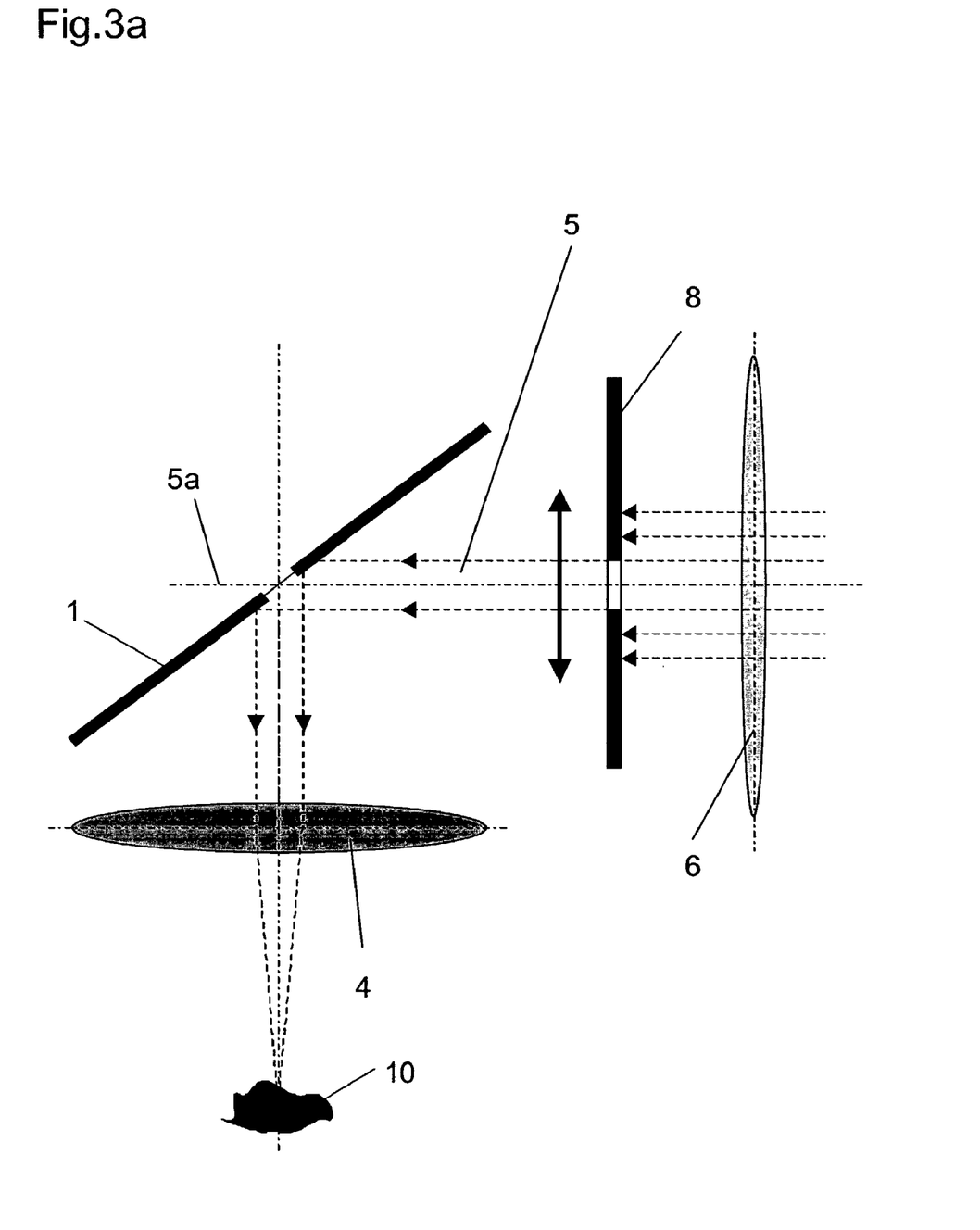
FIGS. 3a–c show the manner of operation of the reflecting-in system in selected and enlarged detail.
Figure 3B:
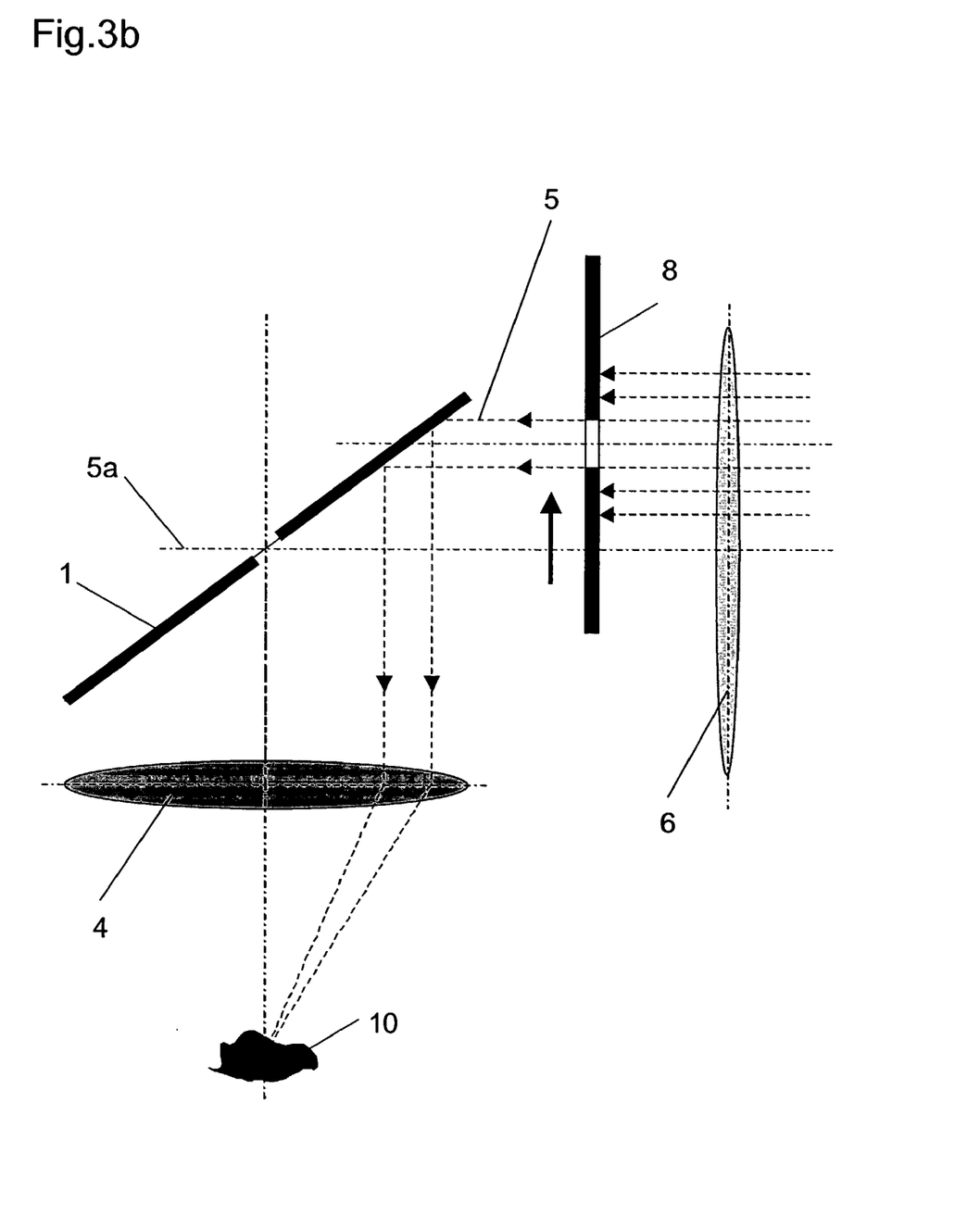
Figure 3C:
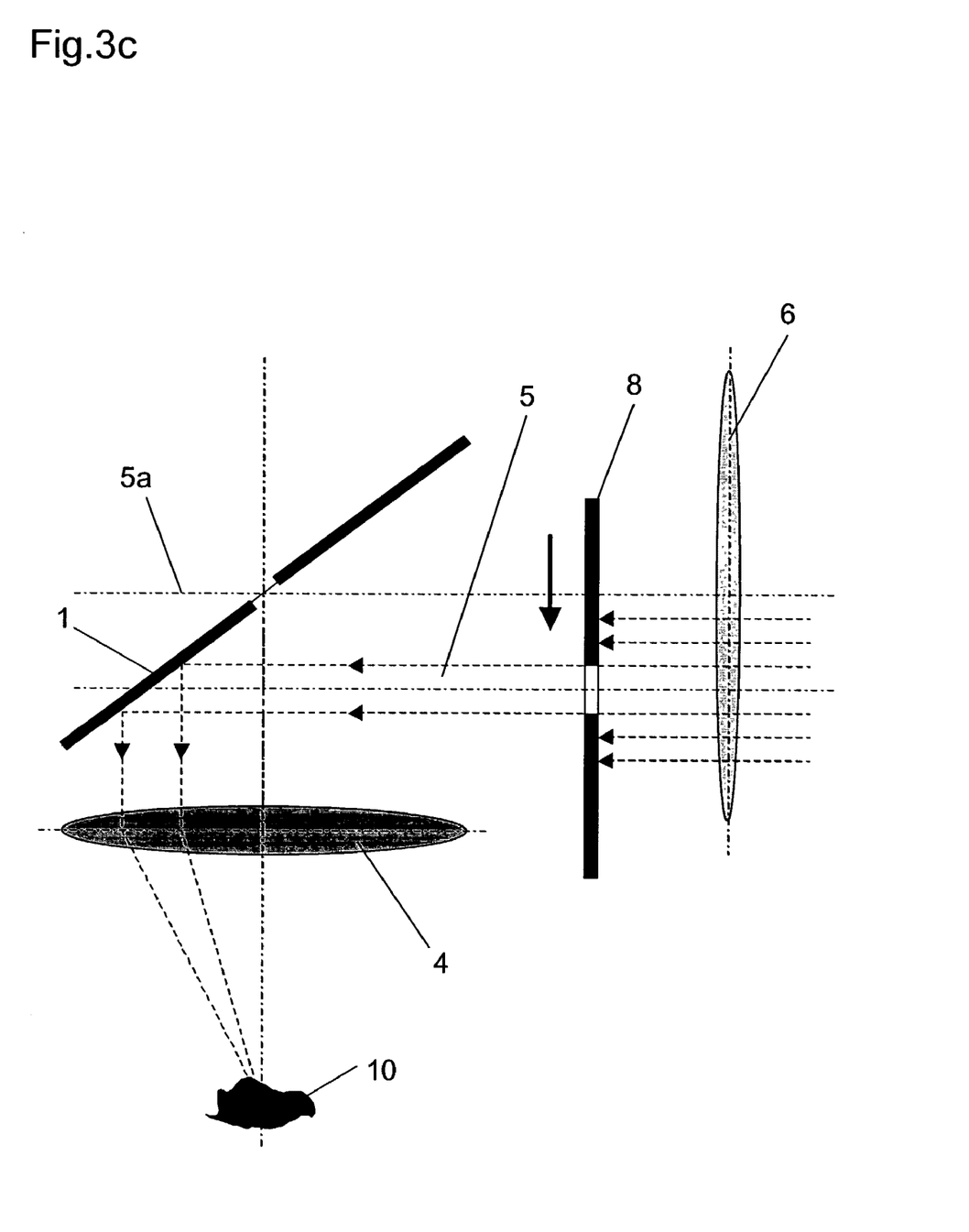

FIGS. 3a–c show in detail the manner of operation of the system for reflecting in illumination, having deflection element 1, main objective 4, axis 5a of illumination beam path 5, stop 8, and illuminating optical system 6. FIG. 3a shows stop 8 centered with respect to axis 5a of illumination beam path 5. FIGS. 3b and 3c show decentered stop positions, stop 8 being shifted upward in FIG. 3b and downward in FIG. 3c.

Figure 4A:
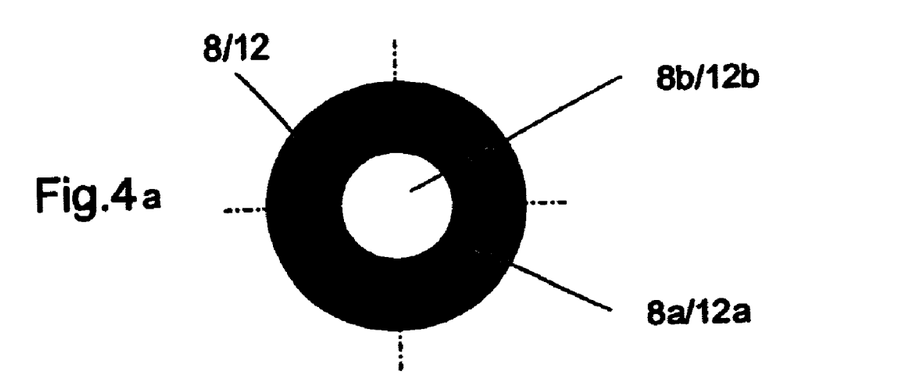
FIGS. 4a, b show a stop for partial light reduction of the illumination beam path.
Figure 4B:
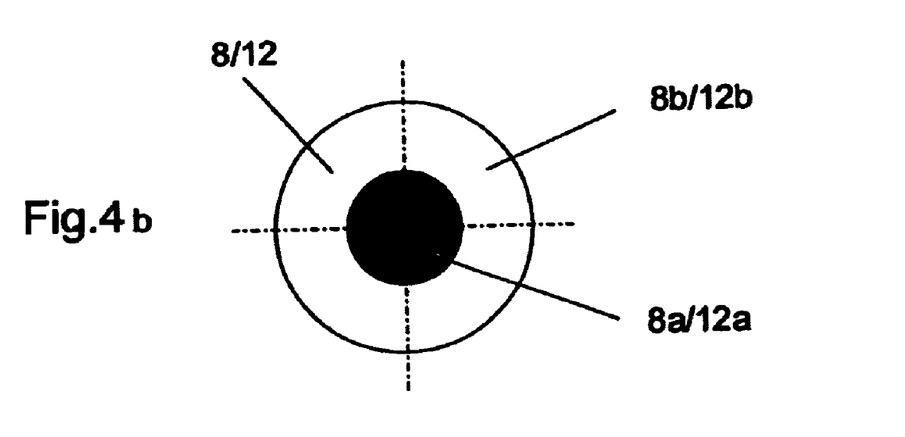

FIGS. 4a and 4b show typical configurations of stops 8 and 12 with light-intensity-reducing regions 8a, 12a and non-light-intensity-reducing regions 8b, 12b, in which context stops 8, 12 can have any shape, in particular including one that is not rotationally symmetrical. Stop 8 is located at an axial position that is non-conjugated with any plane of a specimen field of the microscope. Light-intensity reducing region 12a may be transparent depending on light wavelength.

Manner of Operation

For certain applications, for example when microscopes are used in the medical sector, an illumination beam path 5 is reflected in for specimen field illumination. When a deflection element 1 according to the present invention is used, for example a mirror or deflection prism having two openings 2a, 2b for observation beam paths 3a and 3b as shown in FIG. 1 or 2a, illumination beam path 5 proceeding from light source 7 is switched into the main beam path of the microscope. Deflection element 1 is configured in such a way that its diameter exceeds the spacing of the two observation beam paths 3a and 3b; and it comprises, for each beam path, openings that can be selectably closed off by means of a partially reflective element.

The result of using a stop 8 that can be shifted radially with respect to axis 5a of illumination beam path 5 is that specimen 10 can be illuminated at different angles.

If a stop 8 (FIG. 4b) having a central light-intensity-reducing region (neutral density filter or spectral filter, LCD, etc.) is used, annular illumination of specimen 10 without shadowing can be achieved. Special illumination profiles can be created by means of stops that are not of rotationally symmetrical configuration.

By shifting illuminating optical system 6 in the axial direction, it is possible to configure large specimen fields with a small illumination pupil or small specimen fields with a large illumination pupil.

Instead of stop 8, a wedge-shaped pair of optical elements, wherein one of the pair of optical elements is rotatable or movable relative to the other, can also be used to shift the illumination beam path in order to shift the axis of the illumination beam path. By "wedge-shaped", it is meant that a light exit surface of the pair of optical elements is non-parallel to a light entry surface of the pair of optical elements. For example, the pair of optical elements could comprise a pair of prisms or a concave-convex lens pair.

It is also possible, and a type of embodiment, for the entire illuminating optical system with axis 5a to be shifted parallel to the centered position. As a result, the entire illumination pupil remains effective with the corresponding light intensity, even in the shifted state; shifting of stop 8, on the other hand, means a reduction of the illumination pupil and thus a reduction in intensity.

The invention has been described in detail with particular reference to certain preferred embodiments thereof, but it will be understood that variations and modifications can be effected within the spirit and scope of the invention.

PARTS LIST

1 Deflection element
2a, b Openings for observation beam paths
3a, b Observation beam paths 4 Main objective 5 Illumination beam path 5a Axis of illumination beam path
6 Illuminating optical system
7 Light source
8 Stop
8a, b Light-intensity-reducing/non-light-intensity-reducing region
9 Electronic stop control system
10 Specimen
11 Zoom
12 Stop
12a, b Light-intensity-reducing/non-light-intensity-reducing region
13 Axes of observation beam paths
14 Observer
15 Eyepiece
A Section A—A
B Section B—B

What is claimed is:

1. A microscope comprising:
    a main objective;
    a pair of spaced observation beam paths passing through the main objective;
    a deflection element having a pair of spaced openings for the pair of observation beam paths and a planar deflection surface surrounding both of the pair of spaced observation beam paths;
    a light source;
    collimating optics after the light source for providing a collimated illumination beam traveling along an illumination axis;
    a stop radially adjustable relative to the illumination axis to selectively allow passage of a spatial portion of the collimated illumination beam and block passage of another spatial portion of the collimated illumination beam, the spatial portion of the collimated illumination beam that passes through the stop being deflected by the planar deflection surface to pass through the main objective and illuminate a specimen;
    wherein an angle at which the specimen is illuminated is adjusted without changing location of the deflection surface by adjusting the stop radially relative to the illumination axis.

2. The microscope as defined in claim 1, wherein the stop is movable along a radial direction relative to the illumination axis.

3. The microscope as defined in claim 1, wherein the stop is rotatable about an axis relative to the illumination axis.

4. The microscope as defined in claim 1, wherein the stop is insertable into and removable from the collimated illumination beam.

5. The microscope as defined in claim 1, wherein the stop is located at an axial position that is non-conjugated with any plane of a specimen field of the microscope.

6. The microscope as defined in claim 1, wherein the stop includes a light-intensity-reducing region that is transparent depending on light wavelength.

7. The microscope as defined in claim 1, wherein the stop is a diaphragm stop.

8. The microscope as defined in claim 1, wherein the stop is a thin film stop.

9. The microscope as defined in claim 1, wherein the stop is a liquid crystal stop.

10. The microscope as defined in claim 1, wherein the stop is an electrochromic layer stop.

11. The microscope as defined in claim 1, wherein the stop is also adjustable in an axial direction along the illumination axis for changing an illumination pupil.

12. The microscope as defined in claim 1, further comprising another stop, the another stop being adjustable in an axial direction along the illumination axis for changing an illumination pupil.

13. The microscope as defined in claim 1, further comprising a lens adjustable in an axial direction along the illumination axis for changing an illumination pupil.

14. A method for illuminating a microscope specimen comprising the steps of:
    generating a collimated illumination beam traveling along an illumination axis;
    adjusting a stop radially relative to the illumination axis, the stop allowing passage of a selected spatial portion of the illumination beam and blocking passage of another spatial portion of the illumination beam; and
    deflecting the selected spatial portion of the illumination beam at an angle to the illumination axis using a single planar deflection surface to cause the selected spatial portion of the illumination beam to pass through a main objective of the microscope and illuminate the specimen;
    wherein an angle at which the specimen is illuminated is adjusted by radially adjusting the stop without changing location of the deflection surface.

15. The method as defined in claim 14, wherein the step of adjusting the stop is controlled electronically.

16. The method as defined in claim 14, wherein the step of adjusting the stop is controlled manually.

17. The method as defined in claim 14, further comprising the step of adjusting the stop in an axial direction along the illumination axis to change an illumination pupil.

* * * * *